United States Patent [19]

Wirth, Jr.

[11] 4,263,145

[45] Apr. 21, 1981

[54] RECOVERY OF AMMONIA OR AMINE FROM A CATION EXCHANGE RESIN

[75] Inventor: Louis F. Wirth, Jr., Midland, Mich.

[73] Assignee: The Dow Chemical Company, Midland, Mich.

[21] Appl. No.: 158,096

[22] Filed: Jun. 10, 1980

[51] Int. Cl.³ ............................................... B01J 1/04
[52] U.S. Cl. ................................... 210/675; 210/677; 210/687; 423/352; 423/356; 423/357; 544/106; 564/462
[58] Field of Search ......................... 210/32, 34, 38 A; 260/563 C; 544/106; 423/352, 356, 357, 181; 521/26

[56] References Cited

U.S. PATENT DOCUMENTS

| | | | |
|---|---|---|---|
| 3,385,787 | 5/1968 | Crits | 210/32 |
| 3,501,401 | 3/1970 | Calmon | 210/33 |
| 3,709,818 | 1/1973 | Gustafson | 210/32 |
| 3,983,220 | 9/1976 | Pollock | 210/32 |
| 4,151,079 | 5/1978 | Horembala | 210/32 |

OTHER PUBLICATIONS

External Regeneration of Condensate Polisher Resins by Use of Calcium Hydroxide by Sisson et al., The American Power Conference, Apr. 21, 1970.

Condensate Polishing Experience at Three Mile Island, Harner, Fortieth Annual International Water Conference, Oct. 30, 1979.

*Primary Examiner*—Ernest G. Therkorn

[57] ABSTRACT

Ammonia or an amine such as morpholine is recovered from a resin bed comprising an alkali metal, e.g., sodium, and ammonium or amine salts of a strong acid cation exchange resin by contacting the cation resin with an aqueous solution of an alkaline earth metal hydroxide, e.g., calcium hydroxide, thereby exchanging the alkali metal and ammonium or amine cations with alkaline earth metal cations. The aqueous liquid containing the alkali metal and ammonia or amine is subsequently passed through a cation exchange resin which removes the alkali metal from the liquid. The recovery of ammonia or the amine by such method is particularly useful in condensate purification system associated with a power production facility wherein the recovered ammonia or amine can be employed to reduce corrosion in the power production facility and the strong acid resin, upon regeneration, can be used to remove alkali metal ions, particularly sodium, from the facility.

17 Claims, 2 Drawing Figures

RECOVERY OF AMMONIA OR AMINE FROM A CATION EXCHANGE RESIN

BACKGROUND OF THE INVENTION

This invention relates to the recovery of ammonia or an amine from a resin bed comprising the alkali metal and ammonium or amine salts of a strong acid cation exchange resin.

In the production of power, such as in a steam turbine system wherein large amounts of water are converted to steam and subsequently condensed, to reduce the corrosive effect of the water supplied for steam generation, the pH of the water is adjusted to above about 9 by the addition of ammonia. In addition, the water is required to be free of solid content, the presence of which produces surface coatings within the turbine, boiler and conduits and otherwise deleteriously affects power production. Although the condensed water (hereinafter "condensate") is recycled through the system, solid forming precursors, particularly alkali metal solutes such as sodium ions, are introduced into the system by the addition of make-up water, leakages, corrosion of metals and the like.

To remove such solid forming precursors, the condensate, including any make-up feed water, is purified in a condensate polishing operation. Such operation conventionally consists of contacting the condensate with both anion and cation exchange resins, typically a mixed resin bed containing a mixture of a strong acid cation exchange resin and a strong base anion exchange resin or with separate resin beds, wherein one bed contains a strong acid cation exchange resin and a second bed contains a strong base anion exchange resin or a mixture of anion and cation exchange resins. In operation, the cations in solution such as sodium or ammonium ions are exchanged for the cations, typically hydrogen, on the cation exchange resin. Similarly, anions in solution are exchanged with the anions, typically hydroxide, on the anion exchange resin.

Upon exhaustion of the resins, e.g., the reduction in the capacity of the resins to a commercially impractical level, the anion and cation resins are separated and the separated resins regenerated. The anion exchange resin is conventionally regenerated employing techniques such as described in U.S. Pat. Nos. 3,385,787 and 3,501,401.

Typically, the exhausted cation resin is regenerated using a strong mineral acid such as sulfuric or hydrochloric acid as the regenerant. Upon regeneration, hydrogen displaces the alkali metal and ammonium or amine ions on the cation exchange resin, converting the resin to hydrogen form. The alkali metal and ammonium or amine ions exit from the resin bed with the regenerant solution. The relatively high concentration of alkali metal ions in the exiting regenerant solution precludes the reuse thereof within the power production facility. Thus, the exiting regenerating solution is conventionally sent to waste. Unfortunately, the ammonium or amine ions in this solution, which ions are usefully employed in reducing the corrosive effects of the condensate, are also wasted. Thus, relatively large amounts of ammonia must be added to the system to impart the required pH to the condensate. Moreover, pollution problems are often associated with the disposal of the solution containing the ammonium or amine ions.

Therefore, in view of the expense incurred in not reusing the ammonia and the problems associated with its disposal, it would be highly desirable to provide a method for recovering the ammonia or amine from a resin bed comprising a cation exchange resin having both ammonium or amine and alkali metal cations attached thereto.

SUMMARY OF THE INVENTION

Accordingly, the present invention is a method for recovering ammonia or an amine from a strong acid cation exchange resin having both alkali metal and ammonium or amine cations attached thereto. In said method, alkaline earth metal cations are exchanged for the alkali metal and ammonium or amine cations on the cation resin by contacting the cation resin with an aqueous liquid containing alkaline earth metal cations at conditions sufficient to form an aqueous liquid containing hydroxides of the alkali metal and ammonia or amine. In one particular embodiment, such exchange is conducted by contacting the cation resin with an aqueous solution of an alkaline earth metal hydroxide. In a second particular embodiment, the cation exchange resin is contacted with an aqueous solution of a salt of the alkaline earth metal and the resulting aqueous liquid containing the salts of the alkali metal and ammonia or amine subsequently contacted with a strong base anion exchange resin in hydroxide form. The resulting aqueous solution of the hydroxides of the alkali metal and ammonia or amine is subsequently contacted with a cation exchange resin at conditions such that the concentration of the alkali metal in the solution is reduced.

By the method of this invention, ammonia or an amine essentially free of the alkali metal can be recovered from a strong acid cation exchange resin having both alkali metal and ammonium or amine cations attached thereto (i.e., the alkali metal and ammonium or amine salts of a strong acid cation exchange resin). For example, the concentration of the alkali metal in the aqueous liquid containing the ammonia or amine can be reduced to less than 1 part per billion (ppb) by the method of this invention. Therefore, the recovered ammonia or amine can be effectively employed in a power production facility. Moreover, the strong acid cation resin can easily be regenerated for reuse by conventional techniques.

The present invention is particularly useful in a method for the purification of a condensate which condensate contains both alkali metal and ammonium or amine cations wherein the condensate is contacted with a resin bed comprising a strong acid cation exchange resin. In said method, upon exhaustion of the cation resin, the ammonia or amine is recovered essentially free of any alkali metal by exchanging the alkali metal and ammonium or amine cations attached to the cation resin with alkaline earth metal cations by contacting the cation resin with an aqueous liquid containing alkaline earth metal cations at conditions sufficient to form an aqueous solution of hydroxides of the alkali metal and ammonia or amine. The ammoniated liquid containing the hydroxides of the alkali metal and ammonia or amine is subsequently contacted with a cation resin at conditions sufficient to remove essentially all the alkali metal from the liquid. The recovered ammonia or amine can be reused in the power production facility without alkali metal contamination. Moreover, the strong acid cation exchange resin is readily regenerated and subsequently remixed with the regenerated anion resin for reuse in purifying the condensate.

BRIEF DESCRIPTION OF THE DRAWINGS

Understanding of this invention will be facilitated by referring to the accompanying drawings in which the FIGS. 1 and 2 are diagrammatic flow sheets of a condensate purification operation which incorporates alternate embodiments of the present invention for recovering ammonia or an amine essentially free of alkali metal.

DETAILED DESCRIPTION OF THE PREFERRED EMBODIMENTS

Figure 1:
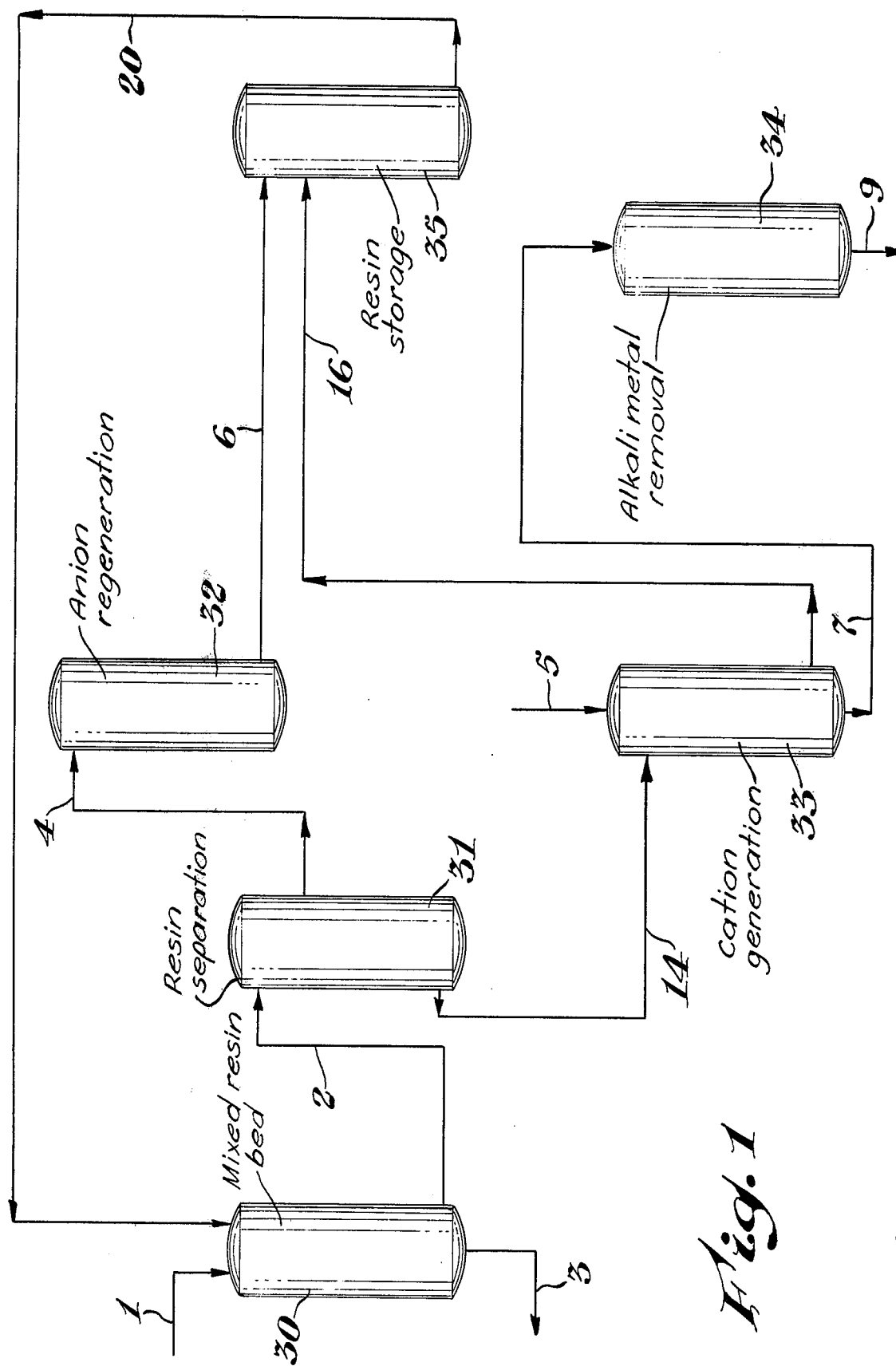

Referring more particularly to the drawings, the Figures depict a condensate purification system which is generally a portion of a power production facility (not shown) such as a steam generating operation and which incorporates an embodiment of this invention. In the Figures, condensate, which condensate can also contain make-up feed water, is discharged from a condensate inlet line 1 into an ion exchange tank or column 30 containing a resin bed comprising a mixture of anion and cation exchange resins, generally, a mixture of a strong base anion resin and strong acid cation resin. Although the Figures depict a single, mixed bed, ion exchange column, conventionally, the condensate purification system will comprise a plurality of such columns operating in parallel. Alternatively, the condensate purification system comprises a column containing a strong acid resin followed by a column containing a strong base resin or mixture of strong base and strong acid resins. As the condensate passes through the mixed resin bed of column 30, anions and cations in solution are exchanged for the anions, typically hydroxide on the anion exchange resin, and the cations, typically hydrogen, on the cation exchange resin. Of particular importance is the removal of alkali metal, e.g., sodium, cations from solution by such exchange. In addition, other cations such as ammonium or amine cations are also removed from solution. Upon exiting from column 30, the alkali metal free condensate is recycled to the steam generating operation by means of condensate outlet line 3.

Upon exhaustion of the resin in column 30, e.g., the reduction in capacity of the resin to a commercially impractical level such as when the condensate exiting from the resin bed contains more than about 1 ppb sodium, the anion and cation resins are transferred from column 30 to a resin separation tank or column 31 by means of resin transfer line 2. The resin mixture in separation column 31 is separated by conventional techniques to form an anion exchange resin rich layer, i.e., a layer consisting primarily of the anion resin, and a cation exchange resin rich layer. Separation techniques are well known in the art and reference is made thereto for the purposes of this invention. Conventionally, the separation is conducted by backwashing the mixed resin bed, i.e., fluidizing the mixed resin bed by passing a water wash through the bed for a limited time and thereafter allowing the resins to settle. Since the cation resin is generally more dense than the anion exchange resin, it settles first and stratification of the cation and anion resins results. Advantageously, to facilitate complete separation of the anion and cation exchange resins, such separation is conducted in the presence of an inert interfacial material using the methods disclosed by U.S. Pat. Nos. 2,666,741 and 4,151,332, which are hereby incorporated by reference.

After separating the resins, both resins can be regenerated in the separation tank without prior removal of either resin therefrom or either the anion or cation resin can be transferred to a separate regeneration column and the separation column employed in the regeneration of the resin remaining therein. Alternatively, as depicted by the Figures, both the separated anion and cation resins can be transferred from the separation tank 31 prior to their subsequent regeneration. In the Figures, the anion exchange resin is transferred from the resin separation column 31 to the anion regeneration column 32 by means of anion transfer line 4 for regeneration. The separated cation resin, which resin has both alkali metal and ammonium or amine cations attached, either chemically or ionically, thereto is transferred to cation resin regeneration column or tank 33 by means of line 14.

The anion exchange resin is regenerated for subsequent reuse using techniques well known in the art for regenerating anion exchange resins, particularly those techniques specific to the regeneration of anion exchange resins employed in a condensate purification system, and reference is made thereto for the purpose of this invention. Due to the generally incomplete separation of the anion and cation resins, the anion resin rich layer generally contains some cation resin, a portion of which cation resin is in the alkali metal form. To prevent the leakage of the alkali metal from the cation resin in the anion resin rich layer to the steam generating operation, the anion resin is advantageously regenerated by the methods of U.S. Pat. Nos. 3,385,787, 3,501,401 and/or 3,709,818, which are hereby incorporated by reference. Typically, by such disclosed methods, regeneration of the separated anion exchange resin layer is effected using an aqueous solution of an alkali metal hydroxide such as sodium hydroxide. Thereafter, the anion exchange resin layer is contacted with an aqueous solution of ammonia or an alkaline earth metal hydroxide, e.g., calcium hydroxide, to replace the alkali metal on the cation exchange resin intermixed in the anion exchange resin with ammonia or alkaline earth metal. The regenerated anion resin is transferred to a resin storage tank or column 35 through line 6.

In recovering the ammonia or amine from the exhausted cation resin, the alkali metal and ammonium or amine cations are exchanged with alkaline earth metal cations at conditions sufficient to form an aqueous solution of hydroxides of the alkali metal and ammonia or amine. In one embodiment, such exchange comprises contacting the cation resin with an aqueous solution of an alkaline earth metal hydroxide, e.g., calcium hydroxide. As depicted in FIG. 1, such contact advantageously comprises passing a solution of the alkaline earth metal hydroxide introduced by means of line 5 downwardly through the cation resin contained in column 33. As the alkaline earth metal hydroxide passes through the cation exchange resin, the alkaline earth metal cations displace the alkali metal and the ammonium or amine cations on the cation resin. Therefore, the ammoniated liquid exiting from column 33 is an aqueous solution of an alkali metal hydroxide, generally in an essentially completely ionized form, and ammonia or amine including hydroxides thereof.

Figure 2:
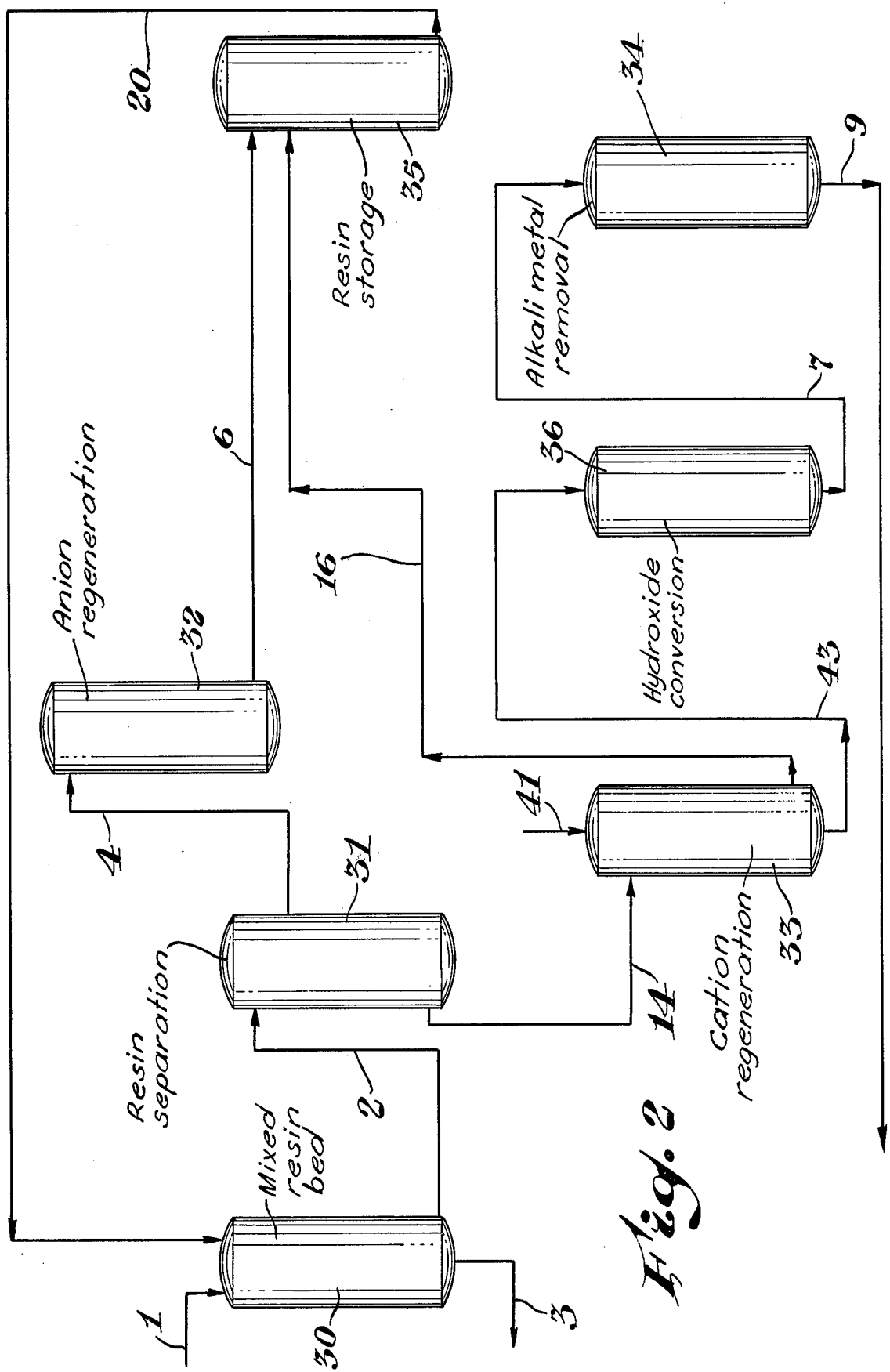

Alternatively, as depicted in FIG. 2, in a second embodiment of this invention, the required exchange comprises contacting the cation exchange resin in column 33 with an aqueous salt solution of an alkaline earth metal, e.g., magnesium chloride, introduced into the column through line 41. In said embodiment, the ammoniated liquid exiting from column 33 is an aqueous solution containing salts of the alkali metal and ammonia or amine, said salts being generally in an essentially completely ionized form. The aqueous liquid is transferred from column 33 to a hydroxide conversion tank or column 36 by means of transfer line 43. Column 36 contains a strong base anion exchange resin in the hydroxide form. As the aqueous liquid containing the alkali metal salt passes through the anion resin, the anions in the aqueous liquid are exchanged with the hydroxide anions on the anion resin. As such, the ammoniated liquid exiting from column 36 is an aqueous solution of an alkali metal hydroxide, generally in an essentially completely ionized form, and ammonia or amine including hydroxides thereof.

The concentration of the alkali metal of the ammoniated liquid containing the hydroxides of the alkali metal and the ammonia or amine is reduced by contacting the liquid with a cation exchange resin such as by passing the ammoniated liquid transferred through transfer line 7 to an alkali metal removal tank or column 34 downwardly through a bed of cation resin contained by column 34. Alternatively, the liquid can flow upwardly through the cation resin bed or batchwise procedures be employed. As the liquid passes through the cation exchange resin, the alkali metal cations are removed from the liquid and the concentration of the alkali metal reduced. In general, sufficient amounts of the alkali metal are removed such that the concentration of the alkali metal is reduced to less than about 1 ppb while the concentration of the ammonia in the aqueous liquid remains essentially constant.

As the ammoniated liquid exits from the cation resin contained by column 34, the concentration of the alkali metal is measured using conventional techniques, such as conductivity measurements. If the concentration of the alkali metal has been reduced to desirable levels, the ammoniated liquid is recirculated through line 9 to the power production facility. If a lower concentration of the alkali metal is desired, the ammoniated liquid is passed through additional columns containing a cation exchange resin until the desired alkali metal concentration is obtained. Upon obtaining the desired level of alkali metal in the ammoniated water, it is returned, i.e., recycled, to the power production facility through line 9.

Following the removal of the alkali metal and ammonium or amine cations attached to the cation exchange resin contained by the cation resin regeneration column 33, the resin, which is in alkaline earth metal form, can be regenerated using any of a variety of procedures. For example, the cation resin can be contacted with an aqueous solution of hydrochloric or sulfuric acid at a concentration and in amounts sufficient to convert essentially all the resin from alkaline earth metal to a hydrogen form. In such regeneration, the hydrochloric acid solution advantageously comprises from about 5 to about 10 weight percent acid. Alternatively, the concentration of the sulfuric acid solution is dependent on the specific alkaline earth metal on the resin. For example, regeneration of the resin in calcium form advantageously comprises conventional step-wise regeneration techniques using a dilute sulfuric acid solution, e.g., about a 0.5 weight percent solution, initially and increasing the concentration of the sulfuric acid solution step-wise to a final concentration of about a 5 weight percent solution.

Advantageously, prior to treatment with sulfuric acid, the cation resin is converted to a magnesium form by exchanging the nonmagnesium alkaline earth metal cations, e.g., calcium cations, on the cation resin with magnesium cations. Such exchange is advantageously conducted by contacting the cation resin with an aqueous solution of a magnesium salt, advantageously magnesium chloride, such as by passing the aqueous liquid downwardly through the resin bed. The concentration of the magnesium in the aqueous solution is not particularly critical and can generally range from about 0.1 to about 20, preferably from about 0.2 to about 5, weight percent of the solution, said weight percent being based on the weight of the magnesium salt and aqueous liquid. Sufficient amounts of the magnesium salt are employed to replace essentially all, e.g., at least about 90 percent, of any other alkaline earth metal cation, e.g., calcium cation, attached to the resin with magnesium cation. Thus, to ensure complete conversion of the resin to magnesium form, the magnesium salt is advantageously employed in amounts which are at least about 1.2, preferably from about 1.5 to about 2, times the stoichiometrically equivalent amount of the nonmagnesium alkaline earth metal cations on the cation resin.

The resulting magnesium form cation resin is then contacted with sulfuric acid at conditions which replace essentially all the magnesium cations with hydrogen. Advantageously, an aqueous solution of sulfuric acid, which solution can comprise up to about 10 weight percent acid, preferably from about 5 to about 10 weight percent acid, is employed for said purpose. The regenerated cation exchange resin is generally washed and then transferred from column 33 through line 16 to resin storage tank 35, wherein the regenerated anion and cation resins are mixed in their desired concentration. The mixture of regenerated anion and cation exchange resins can then be transferred by means of line 20 to column 30 for reuse in the purification of the condensate from the power production facility.

Upon exhaustion of the cation exchange resin in column 34, e.g., the cation exchange resin can no longer reduce the sodium level to the desired concentration, the cation resin bed can be regenerated using regenerants such as sulfuric or hydrochloric acid in a conventional manner well known in the art for regenerating cation exchange resins. Similarly, upon exhaustion of the anion resin in the hydroxide conversion column 36, the anion resin can be regenerated with a regenerant such as sodium hydroxide using conventional techniques well known in the art for regenerating anion exchange resins.

With regard to the various components useful in the practice of the present invention, the cation exchange resin having both alkali metal or ammonium or amine cations attached thereto is a strong acid cation resin. Such strong acid cation resins (herein generally referred to as "cation resins") are well known in the art and can be of the gel or macroporous type. Conventionally, the cation resin is the sulfonated copolymer of a monovinylidene aromatic such as styrene and a polyethylenically unsaturated monomer copolymerizable therewith such as divinylbenzene. In the purification process, such as depicted by the Figures wherein the resin removes alkali metal and ammonium or amine cations, conventionally sodium and ammonium or morpholine cations, from solution, a gel type cation exchange resin, normally in the hydrogen form, with a density from about 1.2 to about 1.4 g/cc, is generally employed.

In many cases, particularly in condensate purification processes, an anion exchange resin (herein generally referred to as "anion resin") of either the gel or macroporous type is generally employed in conjunction with the cation resin. Such anion resins are well known in the art and advantageously are strong base anion resins of the gel type having a density from about 1.0 to about 1.08 g/cc. Conventionally, such anion resin is a cross-linked copolymer of a monovinylidene aromatic and a polyethylenically unsaturated monomer copolymerizable therewith which polymer bears quaternary ammonium groups.

Advantageously, both the cation and anion resins are prepared in a spheroidal bead form with a volume average particle size ranging from about 0.15 to about 0.84, preferably from about 0.3 to about 0.7, mm. Exemplary resins, including their methods of preparation, are illustrated in *Ion Exchange* by F. Helfferich, published in 1962 by McGraw-Hill Book Company, New York and U.S. Pat. Nos. 2,788,331; 2,992,544; 3,337,479 and 3,549,562.

In general, such resins exhibit sufficiently different properties such that, upon exhaustion, the anion and cation resins in a mixed resin bed separate into an anion resin rich layer and a cation resin rich layer upon fluidic classification, e.g., backwashing and settling, of the resin bed. As the cation resin generally has a higher density than the anion resin, the cation resin rich layer normally forms on the bottom of the column following classification.

To effect more complete separation of the anion and cation resins, an inert material which exhibits properties such that upon fluidic classification of the mixed resin bed (i.e., the anion and cation exchange resins and the inert material) it forms a layer positioned between the layer of cation resin and layer of anion resin is often advantageously employed. By the term "inert" is meant that the material is sufficiently chemically and physically inert to the liquids or liquid solutions which contact the material during the practice of this invention that the material retains essentially the same fluidization properties. Such inert materials and techniques employed in their use are illustrated by U.S. Pat. Nos. 2,666,741 and 4,151,332. Typically, of such inert materials, those which are in the shape of spheroidal beads having a weight average particle size of about 0.15 to about 0.84, preferably from about 0.3 to about 0.7, mm and a density of from about 1.10 to about 1.22, preferably from about 1.12 to about 1.18, g/cm$^3$ are advantageously employed herein.

In one embodiment of the invention, a hydroxide of the alkaline earth metal, preferably an aqueous solution of the hydroxide, is employed to replace the alkali metal and ammonium or amine cations from the cation resin employed in the condensate purification process. As the hydroxides of beryllium and magnesium exhibit only a limited solubility in water, they are generally not employable herein. On the other hand, barium and strontium hydroxides are water soluble and the use thereof will effectively remove the alkali metal and ammonia or amine cations from the resins. However, such alkaline earth metals are not as preferred as calcium due to the relatively high rational thermodynamic equilibrium which causes difficulties in their subsequent removal from the resin.

In a second embodiment of this invention, an aqueous solution of an alkaline earth metal salt is employed to replace the alkali metal and ammonium or amine cations. Again, due to the fact that barium and strontium possess relatively high rational thermodynamic equilibriums, salts thereof are not generally advantageously employed herein. Advantageously, the water-soluble salts of beryllium, calcium and magnesium, preferably the water-soluble salts of calcium or magnesium, are employed herein. Of such salts, calcium chloride, magnesium chloride and magnesium sulfate are preferred.

Using either embodiment, the alkaline earth metal is employed in an amount sufficient to remove the desired amounts of the alkali metal, e.g., sodium, from the cation resin. In a normal operation, sufficient amounts of the alkaline earth metal are employed to remove essentially all the alkali metal and ammonium or amine cations. Advantageously, the alkaline earth metal is employed in an amount which is at least stoichiometrically equivalent to the alkali metal and ammonia or amine cations on the resin. To ensure complete replacement of the alkali metal cations, it is often advantageous to use at least about 1.1, preferably from about 1.2 to about 1.5, times the stoichiometric amount of the alkaline earth metal.

The concentration of the alkaline earth metal in the alkaline earth metal hydroxide or salt solution is not particularly critical provided that, following the exchange of alkaline earth metal cations with the alkali metal and ammonium or amine cations on the cation exchange resin, the concentration of the alkali metal and ammonium or amine cations in the resulting solution is greater than the concentration of these cations in the aqueous liquid employed in loading the cation resin, e.g., the concentration of the alkali metal and ammonium or amine cations in the ammoniated liquid (such as contained by transfer line 7 in the Figures) is greater than the concentration of these cations in the original condensate (such as contained by condensate line 1 in the Figures). In general, an aqueous solution of calcium hydroxide being from about 0.01 to about 0.4 Normal, wherein Normality is the equivalent weight of the dissolved calcium per liter of solution, is advantageously employed herein. As a particular example, an aqueous solution comprising from about 0.1 to about 0.12 weight percent calcium hydroxide is advantageously employed in conjunction with a resin which has been employed to purify condensate in a power production facility. Aqueous salt solutions of the alkaline earth metal being from about 0.1 to the maximum solubility of the salt in the aqueous liquid, preferably aqueous solutions comprising from about 0.2 to about 20, more preferably from about 0.5 to about 10, weight percent of the alkaline earth metal salt are advantageously employed herein.

The cation exchange resins useful in removing the alkali metal cations from the ammoniated, aqueous liquid containing both the alkali metal and ammonium or amine cations are weak or strong acid cation exchange resins which are capable of reducing the concentration of the alkali metal in the liquid without reducing the concentration of the ammonia or amine to a negligible level. In general, the cation resin is a strong acid cation exchange resin of a sulfonated copolymer of a monovinylidene aromatic, preferably styrene, and a polyvinylidene aromatic, preferably divinylbenzene, which cation resin in the ammonium form is capable of reducing the alkali metal concentration to less than about 10, preferably less than about 5, more preferably less than about 2, ppb without substantially reducing the concentration of the ammonia or amine. Although such resins may be of the macroporous type, they are preferably of the gel type. Various forms of strong acid cation exchange resins can be employed and in the normal practice of this invention, the resin is generally in a hydrogen form, with the majority of the resin being converted to an ammonium form upon initial contact with the ammoniated liquid.

As used herein, the term "aqueous liquid" refers to water (including aqueous liquids such as alkaline or acidic aqueous solutions, e.g., an aqueous solution of calcium or sodium hydroxide, or aqueous salt solutions) or a mixture of water and a water miscible liquid, preferably a polar liquid such as a lower alkanol, e.g., methanol, ethanol or propanol; a lower ketone, e.g., acetone or methylethyl ketone; an ether, e.g., diethyl ether or diethylene glycol methyl ether; and the like.

As used herein, the term "amine" refers to water-soluble, primary, secondary and tertiary amines, particularly to those amines conventionally employed in a condensate purification process such as morpholine and cyclohexyl amine.

What is claimed is:

1. A method for recovering ammonia or an amine from a strong acid cation exchange resin having both an alkali metal and ammonium or the amine cations attached thereto, said method comprising the steps of:
   (a) exchanging the alkali metal and ammonium or amine cations on the strong acid cation resin with alkaline earth metal cations by contacting the resin with an aqueous liquid containing alkaline earth metal cations at conditions sufficient to form an aqueous solution of hydroxides of the alkali metal and ammonia or amine and
   (b) subsequently contacting the resulting aqueous solution containing the hydroxides of the alkali metal and ammonia or amine with a cation exchange resin at conditions such that the concentration of the alkali metal in the solution is selectively reduced.

2. The method of claim 1 wherein the exchange of the alkali metal and ammonium or amine cations on the strong acid cation resin is conducted by contacting the resin with an aqueous solution of an alkaline earth metal hydroxide.

3. The method of claim 2 wherein the alkaline earth metal hydroxide is calcium hydroxide.

4. The method of claim 3 wherein the aqueous solution of the alkaline earth metal hydroxide comprises from about 0.1 to about 0.12 weight percent calcium hydroxide.

5. The method of claim 1 wherein the exchange of the alkali metal and ammonium or amine cations on the strong acid cation resin is conducted by contacting the resin with an aqueous salt solution of an alkaline earth metal and subsequently contacting the resulting aqueous liquid containing salts of the alkali metal and ammonia or amine with a strong base resin in hydroxide form.

6. The method of claim 5 wherein the aqueous salt solution of an alkaline earth metal is an aqueous solution of a water-soluble salt of calcium or magnesium.

7. The method of claim 6 wherein the water-soluble salt is calcium chloride, magnesium chloride or magnesium sulfate.

8. The method of claim 7 wherein the aqueous salt solution of an alkaline earth metal comprises from about 0.5 to about 10 weight percent of the alkaline earth metal salt.

9. An improved method for purifying condensate containing alkali metal and ammonium or amine cations, the method comprising the steps of:
   (a) contacting the condensate with a resin bed comprising a strong acid cation exchange resin thereby converting the cation exchange resin to salts of an alkali metal and ammonium or amine; and
   (b) regenerating the cation resin,
the improvement in said method comprising the steps of:
   (c) exchanging the alkali metal and ammonium or amine cations attached to the cation resin, prior to the regeneration thereof, with alkaline earth metal cations, thereby converting the cation resin to alkaline earth metal form, by contacting said resin with an aqueous liquid containing alkaline earth metal cations at conditions sufficient to form an aqueous solution of hydroxides of the alkali metal and ammonium or amine; and
   (d) contacting the aqueous hydroxide solution of the alkali metal and ammonia or amine with a cation exchange resin at conditions sufficient to selectively remove essentially all the alkali metal from the liquid.

10. The method of claim 9 wherein the condensate is contacted with a resin bed comprising a mixture of an anion exchange resin and a cation exchange resin and the mixed resin bed is separated into an anion resin rich layer and a caton resin rich layer prior to the regeneration of the cation exchange resin.

11. The method of claim 10 wherein the anion and cation exchange resins are separated in the presence of an inert interfacial material which forms a layer positioned between the layer of cation resin and layer of anion resin upon separation.

12. The method of claim 10 wherein the cation exchange resin in alkaline earth metal form is regenerated by converting any nonmagnesium alkaline earth metal cations on the cation resin with magnesium cations and subsequently contacting the magnesium form of the cation resin with sulfuric acid.

13. The method of claim 10 wherein the exchange of the alkali earth metal and ammonium or amine cations on the strong acid cation resin with alkaline earth metal cations is conducted by contacting the resin with at least about 1.1 times the stoichiometrically equivalent amount of an aqueous solution of calcium hydroxide being from about 0.1 to about 0.4 Normal, said stoichiometric amount being based on the equivalents of alkali metal and ammonium or amine cations on the resin.

14. The method of claim 13 wherein, following the exchange of the alkali metal and ammonium or amine cations with the calcium cations, the strong acid cation resin in calcium form is contacted with an amount of an aqueous salt solution of magnesium which comprises from about 0.1 to about 20 weight percent of the magnesium salt based on the weight of the magnesium salt, said amount comprising at least about 1.2 times the stoichiometrically equivalent amount of the calcium cations on the strong acid cation resin, and the resin in magnesium form subsequently regenerated.

15. The method of claim 14 wherein the regeneration of the cation resin in magnesium form comprises contacting the resin with sulfuric acid.

16. The method of claim 10 wherein the ammonia or amine is recycled to the condensate.

17. The method of claim 10 wherein the regenerated anion and cation exchange resins are reused in purifying the condensate containing the alkali metal and ammonium or amine cations.

* * * * *